United States Patent [19]
Swift et al.

[11] Patent Number: 5,888,467
[45] Date of Patent: Mar. 30, 1999

[54] AMORPHOUS PRECIPITATED SILICA CHARACTERIZED BY HIGH DISPERSION IN CURED ORGANIC RUBBER COMPOSITIONS

[75] Inventors: Harold E. Swift, Gibsonia; Thomas G. Krivak, Harrison City; Laurence E. Jones, Monroeville, all of Pa.

[73] Assignee: PPG Industries, Inc., Pittsburgh, Pa.

[21] Appl. No.: 956,504

[22] Filed: Oct. 23, 1997

Related U.S. Application Data

[62] Division of Ser. No. 769,969, Dec. 19, 1996, Pat. No. 5,739,197.

[51] Int. Cl.$^6$ ........................................ C01B 33/12
[52] U.S. Cl. ........................................ 423/335
[58] Field of Search ............................. 423/335

[56] References Cited

U.S. PATENT DOCUMENTS

| | | | |
|---|---|---|---|
| 2,940,830 | 6/1960 | Thornhill | 23/182 |
| 3,730,749 | 5/1973 | Morgan | 106/288 B |
| 3,928,541 | 12/1975 | Wason | 423/339 |
| 4,590,052 | 5/1986 | Chevallier et al. | 423/335 |
| 5,094,829 | 3/1992 | Krivak et al. | 423/339 |
| 5,580,919 | 12/1996 | Agnostini et al. | 524/430 |
| 5,587,416 | 12/1996 | Chevallier et al. | 524/492 |
| 5,605,950 | 2/1997 | Evans et al. | 524/492 |
| 5,610,221 | 3/1997 | Waddell et al. | 24/492 |

FOREIGN PATENT DOCUMENTS

| | | | |
|---|---|---|---|
| 501227A1 | 9/1992 | European Pat. Off. | 524/492 |

*Primary Examiner*—Michael Lewis
*Assistant Examiner*—Stuart L. Hendrickson
*Attorney, Agent, or Firm*—George D. Morris

[57] ABSTRACT

Amorphous precipitated silica is characterized by a standard white area of less than 0.8 percent. The low standard white area is a characteristic of the silica which is indicative of high (i.e., very effective) dispersion when the silica is incorporated into organic rubber compositions which are cured.

Cured organic rubber compositions comprising amorphous precipitated silica exhibit low white areas which indicate high dispersion of the silica in the compositions.

7 Claims, No Drawings

AMORPHOUS PRECIPITATED SILICA CHARACTERIZED BY HIGH DISPERSION IN CURED ORGANIC RUBBER COMPOSITIONS

This application is a division of application Ser. No. 08/769,969 filed Dec. 19, 1996 which application is now U.S. Pat. No. 5,739,197.

Amorphous precipitated silica is finding increasing use as a reinforcing pigment in cured organic rubber compositions, especially tire treads. A problem which has arisen is the rather low degree dispersion of amorphous precipitated silica in the cured organic rubber as evidenced by large percentages of total white area in an optical microscope field. Grinding or milling the silica before use in forming the cured organic rubber composition may produce better dispersions and hence exhibit lesser total white area in the optical microscope field, but once the bulk of the improvement has been achieved, continued grinding or milling, even for prolonged periods, does not result in much further improvement in the degree of dispersion.

New amorphous precipitated silicas have now been discovered which are characterized by high degrees of dispersibility in cured organic rubber compositions.

Accordingly, one embodiment of the invention is amorphous precipitated silica characterized by: (a) a standard white area less than 0.8 percent; (b) a BET surface area in the range of from 100 to 300 $m^2/g$; (c) a CTAB surface area in the range of from 85 to 275 $m^2/g$; (d) a Sears surface area in the range of from 200 to 400 $m^2/g$; and (e) a pore diameter at the maximum of the volume pore size distribution function of from 10 to 60 nm.

In this embodiment standard white area is determined using a standard protocol and a standard cured organic rubber formulation. Since both the protocol and the formulation are standardized, the standard white area is properly taken as a characteristic of the amorphous precipitated silica. Amorphous precipitated silicas characterized by low standard white areas may be highly dispersed in many cured organic rubber compositions. The standard protocol to be used for determination of standard white area according to the present invention is as follows:

Mixing Protocol

Use a 1.6-liter Kobelco Stewart Bolling Model "00" internal mixer or equivalent for mixing the various ingredients. The mixer has four rotor speeds: 77, 116, 155, and 230 revolutions per minute (rpm).

Line a 500-milliliter (mL) plastic cup with a polyethylene bag and add Sundex® 8125 oil (Sun Company, Inc., Refining and Marketing Division, Philadelphia, Pa.) in the amount of 30.0 parts per hundred parts of rubber by weight (phr). To the polyethylene bag add 2.5 phr Kadox® 920C surface treated zinc oxide (Zinc Corporation of America, Monaca, Pa.), 2.0 phr Wingstay® 100 mixed diaryl p-phenylenediamine (The Goodyear Tire & Rubber Co., Akron, Ohio; supplier: R. T. Vanderbilt Company, Inc., Norwalk, Conn.), and 1.0 phr rubber grade stearic acid (C. P. Hall, Chicago, Ill.) on top of the oil. Just before mixing, add to the polyethylene bag 4 phr of the amorphous precipitated silica to be tested.

Before beginning the first pass, put 600 grams (g) CV-60 grade natural rubber through the mixer to clean it and bring the temperature up to about 65° C. Turn on the cooling water and open the bottom door to remove the rubber and to cool the mixer to about 38° C.

Commence the first pass by adding the rubber, viz., 363.7 g (70.0 phr) Solflex 1216 solution styrene-butadiene rubber (The Goodyear Tire & Rubber Co., Akron, Ohio) and 155.9 g (30.0 phr) Budene 1207 butadiene rubber (The Goodyear Tire & Rubber Co., Akron, Ohio) to the mixer and mixing for 0.5 minute at 116 rpm. Raise the rotor speed to 155 rpm and add 28.5 phr of the amorphous precipitated silica to be tested. After a further 0.5 minute raise the ram and sweep. After a further 0.5 minute add 32.5 phr of the amorphous precipitated silica to be tested. After a further 0.5 minute raise the ram and sweep. After a further 0.5 minute add 13.0 phr X50S® 1:1 Si-69 silane coupling agent and N330-HAF carbon black (Degussa Corp., Ridgefield, Park, N.J.; supplier: Struktol Corp. of America, Stow, Ohio). After a further 0.5 minute raise the ram and sweep. After a further 0.5 minute add the polyethylene bag and the ingredients contained therein. Mix the stock for an additional 6 minutes to achieve a maximum temperature in the range of from 165° C. to 175° C. and to complete the first pass in the mixer. Depending upon the type of silica, the rotor speed may need to be increased or decreased to achieve a maximum temperature in the foregoing range within the 6-minute mixing period.

Dump the stock, measure its temperature with a thermocouple, and weigh it. Sheet the stock off on a two-roll rubber mill and cut it into strips in preparation for the second pass in the mixer. Mill approximately 60 grams of stock to a thickness of about 0.1 inch (2.54 millimeters (mm)), and use it to make a pouch for 2.0 phr Santoflex® 13 N-(1,3-dimethylbutyl)-N'-phenyl-p-phenylenediamine (Monsanto, St. Louis, Mo.) and 1.5 phr Okerin® 7240 microcrystalline wax/paraffin wax blend (Astor Corporation, Norcross, Ga.).

Allow approximately one hour between the completion of the first pass in the mixer and the beginning of the second pass.

Bring the temperature of the mixer to approximately 38° C. With the cooling water running, commence the second pass by adding the strips of first pass stock to the mixer which is running at 116 rpm. After a further 2 minutes add the pouch containing the Santoflex® 13 N-(1,3-dimethylbutyl)-N'-phenyl-p-phenylenediamine and the Okerin® 7240 microcrystalline wax/paraffin wax blend. After a further one minute raise the ram and sweep varying rotor speed if necessary, mix the stock for an additional one minute to achieve a temperature of 160° C. and to complete the second pass in the mixer.

Dump the stock, measure its temperature with a thermocouple, and weigh it. Sheet the stock off on a two-roll rubber mill and cut it into strips in preparation for the third pass in the mixer. Mill approximately 60 grams of stock to a thickness of about 2.54 mm (0.1 inch) and use it to make a pouch for 1.4 phr rubber makers sulfur (Taber, Inc., Barrington, R.I.), 1.7 phr N-tert-butyl-2-benzothiazole sulfenamide (Monsanto, St. Louis, Mo.), and 2.0 phr diphenylguanidine (Monsanto, St. Louis, Mo.).

Allow approximately one hour between the completion of the second pass in the mixer and the beginning of the third pass.

Bring the temperature of the mixer to approximately 38° C. With the cooling water running, commence the third pass by adding the strips of second pass stock to the mixer which is running at 116 rpm. Immediately thereafter add the pouch containing the sulfur, the N-tert-butyl-2-benzothiazole sulfenamide, and the diphenylguanidine. After a further 15 seconds drop the rotor speed to 77 rpm. After a further 1.5 minutes raise the ram and sweep. Complete the third pass by mixing the stock for no more than an additional 3.5 minutes and dropping it just before the temperature exceeds 125° C.; about 2.5 minutes is typical.

Milling Protocol

Preheat a 2-roll rubber mill to approximately 60° C. With the nip setting at 6.35 mm (0.25 inch) and while the mill is running, feed the stock from the third pass into the mill. Adjust the rolling bank if necessary to maintain uniform thickness. Perform eight side cuts, then eight end passes.

Adjust the nip setting to produce a sheet thickness of 2.032 mm±0.127 mm (0.080 inch±0.005 inch). Sheet the stock off the mill and lay it flat on a clean surface.

Using a stencil, cut a rectangular sample 101.6 mm×76.2 mm (4 inches×3 inches) from the stock and then store the sample between clean polyethylene sheets. Condition overnight at a temperature of 23° C.±2° C. and a relative humidity of 50%±5%.

Curing Protocol

Place the conditioned sample in a 101.6 mm×76.2 mm ×1.524 mm (4 inch×3 inch×0.06 inch) standard frame machine steel mold plate compression mold having a coating of Teflon® polytetrafluoroethylene (E. I. duPont de Nemours & Co., Wilmington, Del.) from 0.0254 mm to 0.0508 mm (0.001 to 0.002 inch) thick, or equivalent, and cure in a 61 centimeter×61 centimeter (24 inch×24 inch) 890 kilo newton (100 ton) 4-post electrically heated compression press, or equivalent, for 20 minutes at 150° C. under a pressure of 13.79 megapascals (2000 pounds per square inch). Remove the resulting cured rubber sheet from the mold and allow it to rest overnight.

Microtomy Protocol Use an RMC MT-6000-XL microtome equipped with a CR2000 cryogenic accessory (RMC Biotechnology Tool Inc., Tucson, Ariz.) and a Micro Star LH grade, black, standard boat style diamond knife (Micro Star Technologies, Huntsville, Tex.), or equivalent, for microtoming. Mount a diamond cutting edge 6 to 10 mm long cut at an included angle of 45 degrees in the microtome cryo knife holder and set the microtome clearance angle to 4 degrees as specified on the bottom of the knife as received.

Set the specimen and diamond knife temperatures identically in the range of from −70° C. to −40° C.

Cut a rough sample about 15 mm×about 15 mm from the cured rubber sheet. Place this rough sample in the microtome stainless steel flat specimen holder and securely tighten the sample down with an Allen wrench supplied with the microtome. Using the specimen trimming block supplied with the microtome, the flat holder, and a razor blade, trim the specimen so that about 4 mm of the specimen protrudes from the face of the holder and trim the corners from the specimen so that the block face for microtoming is about 8 mm long.

Position the holder in the cryo unit arm of the advance mechanism of the microtome so that the length of the block face is vertical. Cool to the specimen temperature set earlier. Manually plane the block face using a dulled edge region of the diamond knife to create a smooth flat surface on the block face. Move the knife edge to use a clean virgin region of the diamond knife edge and plane a few thin sections from the block face. Set the cutting stroke to 5 mm per minute and manually advance the block face to cut sections approximately 2 micrometers ($\mu$m) in thickness on a clean virgin area of the diamond knife edge by moving over to a new area of the same knife.

Secure each section, as it first breaks over the edge of the diamond knife with a pair of biological-grade number 5 fine tipped normally open or normally self-closing straight tweezers (A. Dumont & Fils, Switzerland; Structure Probe Inc., West Chester, Pa.), or equivalent. Hold each section at its corner as it starts to come off and gently pull the section away from the knife edge without breaking, cracking or stretching it throughout the cutting stroke to minimize the possibility of the section rolling up or compressing excessively against the edge of the knife. Cut the sections dry; do not use dimethylsulfoxide or xylenes to aid in cutting. At the end of the cutting stroke, draw the intact section gently with the tweezers onto a cryo-cooled Fisherbrand® Superfast® Plus glass microscope slide, size 25 mm×75 mm×1 mm, (Fisher Scientific Co., Pittsburgh, Pa.), or equivalent. The slide, which has previously been cleaned with optical lens tissue or equivalent, rests on the top of a custom cut U-shaped silicone rubber spacer that surrounds the knife boat on two sides and its back surface. Place from eight to ten thin sections from a sample onto each glass slide and position them for convenient preparation during optical mounting. Remove the slide from the cryo chamber, place it in a microscope slide box to avoid excessive moisture contamination, and allow it to warm to room temperature.

Section Preparation Protocol

Coat the thin sections residing on the microscope slide with Cargille Series A $n_D$=1.550±0.0002 immersion oil (R. P. Cargille Laboratories, Inc., Cedar Grove, N.J.), or equivalent. Tease the thin sections carefully using tweezers and/or pointed probes on the stage of a Nikon SMZ-UZoom 1:10 Stereo Microscope, or equivalent, equipped with A Nikon SMZ-U UW 10xA/24 binocular eyepiece assembly (Nikon Corporation, Tokyo, Japan), or equivalent, at low magnification to remove folds, wrinkles and pleats, and to straighten the sections. Care must be taken not to tear the delicate thin sections during this manipulation process. Align the straightened thin sections parallel to one another in groups of one to five (preferably four) for optimum spatial placement under an 18 mm diameter circular cover glass. Clean an 18 mm diameter, 0.13 mm to 0.17 mm thick circular microscope cover glass, (Fisher Scientific Co., Pittsburgh, Pa.), or equivalent, with optical lens tissue or equivalent, and place it on a group of aligned sections. Two or three groups of sections can be accommodated on a microscope slide. Fold a Scotties® two-ply 23.3 cm×18.2 cm (9.2 inch×7.2 inch) facial tissue (Scott Paper Company, Philadelphia, Pa.), or equivalent, into the approximate size of a slide for use as a blotter. Place the blotter over the cover glass protected sections on the microscope slide and apply a flat plate or microscope slide box over the blotter. Manually apply a firm, gentle, uniformly steady, downward force to the plate or slide box and maintain the force for approximately 15 seconds. Remove the flat plate or slide box and the blotter. Repeat the blotting procedure using a fresh surface of Scotties tissue or equivalent, but use less force.

Equipment and Software Selection Protocol

Use the following equipment or equivalent for field selection: a Nikon Microphot FXA research optical microscope equipped with a phase contrast objective module fitted with a plan 20x/0.05 Ph2 phase objective, a Ph2 phase condenser lens (Nikon Corporation, Tokyo, Japan), a system magnification of 1.25x, and an intermediate lens magnification of 1.25x; a Sony Trinitron PVM 1343MD Color Video Monitor (Sony Corporation, Tokyo, Japan), and a Sony CCD three-chip DXC-760MD Camera (Sony Corporation, Tokyo, Japan); a MacIntosh® IIfx Computer with a Color SuperMac® 43 cm (17 inch) monitor (Apple Corporation, Cupertino, Calif.) and a Data Translations frame store card (Data Translations, Raleigh, N.C.). Use the following software or equivalent for capturing images and image analysis: ColorKit™ software (Data Translations, Raleigh, N.C.), NIH Image software (National Instsoftware (National Institute of Health, Washington, D.C.), and Microsoft® Excel® software (Microsoft Corporation, Redmond, Wash.).

Field Selection Protocol

Scan the microtomed sections having thicknesses in the range of from about 2 to about 3 µm that have been prepared for phase contrast optical microscopic examination to eliminate from further consideration sections which contain major anomalies such as wrinkles, folds, waves, tears, and/or dirt particle populations. Choose fields using blind longitudinal traverses and blind cross traverses of the microscope stage on each section. Use only fields exhibiting low relief (accuracy of white area measurement is enhanced by accepting only substantially flat fields; fields exhibiting variable high relief result in blurred, out of focus images due to the low depth of field which is characteristic of the optical microscope). From at least two sections, capture a total of ten field images as PICT formatted files using the Colorkit® software. Save the PICT files to optical disk for computer assisted white area measurement.

Image Analysis

Videomicrograph files saved as PICT files may be opened directly using the Image software.

Upon opening a PICT file, an image appears as a raster of 640 pixels×480 pixels on the monitor at a scale of 2.00±0.06 linear pixels per micrometer of object distance. The actual value of the scale can be ascertained by projecting horizontally on the monitor an image of a stage micrometer having 10 µm per division, and marking a distance of 250 µm or greater of the displayed image. Enter the actual distance marked into the software and allow the computer to calibrate the scale, also known as a calibration factor, in units of linear pixels/µm.

Analyze each selected field image individually. Smooth the image to remove background noise. Threshold and edit the image manually to identify the white areas to be counted and to remove artifacts. Convert the edited image to a binary image and save the binary image as a file.

From the Options menu, choose the area parameter and set the minimum number of pixels to be counted at 4.

Analyze each binary image to produce a list of numbers, where each number is the area of an individual white area, and save the list. Use the Microsoft® Excel® software to sum the numbers of the list to produce a total white area for the field.

Find the percent white area for a field by dividing the total white area by the total area for one field and multiplying the quotient by one hundred. Find the standard white area by taking the average of the white areas of the ten fields captured. Save all files to optical disk.

This concludes the standard protocol for determination of standard white area.

As before stated, the amorphous precipitated silica of the invention is characterized by a standard white area less than 0.8 percent. Often the standard white area is less than 0.7 percent. In many instances the standard white area less than 0.6 percent. Frequently the standard white area less than 0.5 percent. A standard white area less than 0.45 percent is preferred.

The BET surface area of the amorphous precipitated silica of the present invention is in the range of from 100 to 300 $m^2/g$. Often the BET surface area is in the range of from 125 to 250 $m^2/g$. From 150 to 200 $m^2/g$ is preferred. As used in the present specification and claims, the BET surface area of the amorphous precipitated silica is the surface area determined by the Brunauer, Emmett, Teller (BET) method according to ASTM C 819-77 using nitrogen as the adsorbate but modified by outgassing the system and the sample for one hour at 180° C.

The CTAB surface area of the amorphous precipitated silica of the present invention is in the range of from 85 to 275 $m^2/g$. Often the CTAB surface area is in the range of from 120 to 185 $m^2/g$. From 145 to 185 $m^2/g$ is preferred. As used in the present specification and claims, the CTAB surface area of the amorphous precipitated silica is the CTAB surface area determined in accordance the following procedure: Using a top loader balance, 11.0 grams of cetyltrimethylammonium bromide, also known as CTAB and as hexadecyltrimethylammonium bromide, [CAS 57-09-0] is weighed to the nearest one-tenth milligram and the weight expressed in grams, C, is recorded. The weighed CTAB is dissolved in distilled water and diluted with distilled water to 2 liters in a volumetric flask to form a standard CTAB solution which is stored in the dark for at least 12 days before use. Using a top loader balance, 3.70 grams of Aerosol® OT sodium di(2-ethylhexyl) sulfosuccinate [CAS 577-11-7] (American Cyanamid Co., Wayne, N.J.) is weighed. The weighed Aerosol® OT sodium di(2-ethylhexyl) sulfosuccinate is dissolved in distilled water and diluted with distilled water to 2 liters in a volumetric flask to form a standard Aerosol® OT solution which is stored in the dark for at least 12 days before use. The useful storage lives of the standard CTAB solution and the standard Aerosol® OT solution are two months after preparation. Using a pipette, 10.0 mL of the CTAB standard solution is transferred to a 250 mL Erlenmeyer flask containing a stirring bar. Next, 30 mL chloroform, 50 mL distilled water, 15 drops of 0.02% bromophenol blue aqueous indicator solution, and one drop of 1N aqueous NaOH solution are added to the flask. With vigorous stirring but minimal splashing, the contents of the Erlenmeyer flask are titrated with the standard Aerosol® OT solution from a 50 mL buret. The titration is begun at a rapid drop rate (the stopcock is never wide open) down to about 25 to 30 mL and then more slowly, dropwise, to the end point which will occur at about 37.5 mL. The approach to the end point is characterized first by a milky blue color throughout. Then, as the end point is more closely approached, the bottom chloroform layer becomes a more intense blue and the top aqueous layer takes on a lilac or purple hue. Immediately before the end point, the whole mixture becomes visibly clearer (i.e., less "milky") and the bottom layer is seen as a very intense blue. Using a wash bottle, the inside of the flask is washed down with no more than 25 mL of distilled water. The stirrer speed is increased to resume vigorous mixing for efficient contacting of the two liquid phases. At least 10 seconds are allowed to elapse after each dropwise addition of titrant immediately prior to the endpoint. Stirring is stopped frequently to allow the phases to separate so that the analyst can become familiar with these color changes and then vigorous stirring is resumed. At the end point the bottom phase loses all color and displays a colorless or milky white appearance while the top phase is intensely purple. The procedure is performed at least two times and the average volume of standard Aerosol® OT solution used per titration, V1, is recorded. A 200 mL wide mouth glass bottle is tared and approximately 0.500 gram of silica sample (in the as-received state, not dried) is placed in the bottle and weighed to the nearest 0.1 mg. This silica sample weight, S, is recorded. One hundred milliliters of the standard CTAB solution is pipetted into the bottle and a stirring bar is carefully added. Using a 50 mL pipet, filling and delivering twice, is preferred as the liquid level is easier to control than with a 100 mL pipet. A cap is screwed on the bottle and the contents are stirred gently for 15 minutes without pH adjustment. A pH electrode is placed into the solution in the bottle and gentle stirring is resumed. The pH is adjusted to between 9.0 and 9.5 using 1N aqueous NaOH added dropwise; approximately 5 drops of the 1N NaOH solution are required before the pH stabilizes between 9.0 and 9.5. When the pH has been stabilized between 9.0 and 9.5, the top of the bottle is covered with aluminum foil or equivalent to retard evaporation loss. The mixture is stirred gently for one hour at pH 9.0 to 9.5. The silica-liquid mixture is transferred to centrifuge tubes, balancing them by weighing on a top loader balance. The mixture is centrifuged for 30 minutes to produce a clear centrifugate. Clear centrifugate is carefully withdrawn using a dropping pipet and transferred to a small glass bottle. Using a pipet, 10.0 mL of the centrifugate is transferred into a 250 mL Erlenmeyer flask containing a stirring bar. Next, 30 mL chloroform, 50 mL distilled water, and 15 drops of 0.02% bromophenol blue aqueous indicator solution are added to the flask. The contents of the Erlenmeyer flask are titrated with the standard Aerosol® OT solution from a 50 mL buret using the same procedure and to the same endpoint used in titrating the standard CTAB solution. The volume of standard Aerosol® OT solution used, $V_2$, is recorded. A small glass bottle (less cap) is heated for 2 hours at 105° C. in an oven and cooled in a desiccator. The weight is recorded to the nearest 0.1 mg. Approximately one gram of silica sample is added to the bottle and the weight is recorded to the nearest 0.1 mg. The bottle and the sample are heated in an oven for 2 hours at 105° C. The bottle containing the sample is removed from the oven, immediately capped, and cooled in a desiccator. When cooled to ambient temperature, the cap is removed and the weight of the bottle containing the sample is recorded to the nearest 0.1 mg. The tare weight of the bottle is subtracted from the sample weighings and the weight in grams of the silica before heating, A, and the weight in grams of the silica after heating, B, are recorded. The CTAB surface area (dry basis), $A_{CTAB}$, expressed in $m^2/g$, is calculated according to the formula:

$$A_{CTAB} = \frac{(V_1 - V_2)(C)(A)(28.92)}{(V_1)(S)(B)}$$

The Sears surface area of the amorphous precipitated silica of the present invention may vary somewhat, but usually the Sears surface area is in the range of from 200 to 400 $m^2/g$. Often the Sears surface area is in the range of from 240 to 340 $m^2/g$. From 260 to 300 $m^2/g$ is preferred. As used in the present specification and claims, the Sears surface area of the amorphous precipitated silica is the Sears surface area determined in accordance the following procedure: A sample containing 1.50 grams of amorphous precipitated silica is diluted with $CO_2$-free distilled water at 25° C. to a concentration of 2 to 3 percent by weight $SiO_2$. The mixture is acidified with hydrochloric acid to about pH 3 and diluted with $CO_2$-free distilled water to a volume of 135 mL. Thirty grams of pure crystalline NaCl is added and the mixture is stirred rapidly. As soon as the salt is dissolved, the pH is adjusted to pH 4.0 with 0.1N aqueous NaOH. A "high sodium" (Beckman Type E or equivalent) glass electrode is used. The mixture is rapidly titrated from pH 4.0 to pH 9.0 with 0.1N aqueous NaOH and the volume, $V_t$, is recorded after the pH has remained at 9.0±0.05 for 10 minutes. A blank is prepared as above except that silica is absent. The blank is rapidly titrated from pH 4.0 to pH 9.0 with 0.1N aqueous NaOH and the volume, $V_b$, is recorded after the pH has remained at 9.0±0.05 for 10 minutes. The Sears surface area, $A_{SEARS}$, expressed in $m^2/g$, is calculated according to the formula:

$$A_{SEARS} = 26.4(V_t - V_b)$$

The above procedure is a modification of that described by G. W. Sears, Jr., *Analytical Chemistry*, Volume 28, No. 12 (December 1956) pages 1981–1983.

The pore diameter at the maximum of the volume pore size distribution function of the amorphous precipitated silica of the present invention is from 10 to 60 nanometers (nm). Often the pore diameter at the maximum of the volume pore size distribution function is from 15 to 50 nm. Preferably the pore diameter at the maximum of the volume pore size distribution function is from 20 to 40 nm. The volume average pore size distribution function of the amorphous precipitated silica is determined by mercury porosimetry using an Autoscan mercury porosimeter (Quantachrome Corp.) in accordance with the accompanying operating manual. The contact angle is specified as 140 degrees and the surface tension is specified as 480 dynes/cm (0.480 newtons/meter). In operating the porosimeter, a scan is made in the high pressure range (from about 103 kilopascals absolute to about 227 megapascals absolute). The volume pore size distribution function is given by the following equation:

$$Dv(d) = \frac{P}{d} \frac{dV}{dP}$$

where:
$D_v(d)$ is the volume pore size distribution function, expressed in $cm^3/(nm.g)$;
d is the pore diameter, expressed in nm;
P is the pressure, usually expressed in pounds per square inch, absolute; and
V is the pore volume per unit mass, usually expressed in $cm^3/g$.

Where the data are continuous or substantially continuous (i.e., small intervals between successive values of P), Dv(d) is determined by taking $\Delta V/\Delta P$ for small values of $\Delta P$ from either a plot of V versus P or preferably from the raw data. Each value of $\Delta V/\Delta P$ is multiplied by the pressure at the upper end of the interval and divided by the corresponding pore diameter. The resulting value is plotted versus the pore diameter. The value of the pore diameter at the maximum of the volume pore size distribution function is then taken from the plotted graph. Numerical procedures or other graphical procedures for estimating dV/dP may be used when desired or when necessary due to large intervals between successive values of P.

The gross particles of the amorphous precipitated silica of the present invention may be in many forms as for example, granules, beads, tablets, cylinders, flakes, or powder.

When in the form of a powder, the median particle size is usually in the range of from 5 to 70 $\mu$m. Often the median particle size of the powder is in the range of from 15 to 50 $\mu$m. From 25 to 40 $\mu$m is preferred.

When in the form of beads, the median particle size is usually in the range of from 80 to 350 $\mu$m. Often the median particle size of the beads is in the range of from 150 to 350 $\mu$m. From 250 to 325 $\mu$m is preferred.

Particle size determination of powder, beads, or other shapes having similar sizes is accomplished by laser diffraction techniques.

When in the form of granules, tablets, cylinders, flakes, or other similar shapes produced by compaction techniques, particle size determination is accomplished by screening and sizes are reported in terms of standard sieve designations of the US Standard Sieve Series according to ASTM E 11–87. In most cases the particles have sizes predominantly in the range of from 1 to 15 mm. Often the particles have sizes in the range of from 1 to 10 mm. From 2 to 7 mm is preferred. It is preferred that particles be substantially dust free, i.e., at least 99 percent by weight is retained by a 75 $\mu$m screen. The gross particles of the amorphous precipitated silica of the present invention are preferably granulate such by the produced by the process and apparatus of U.S. Pat. No. 4,807,819.

When the particles are mixed with uncured rubber composition, however, the gross sizes are usually substantially reduced as compared with the particles before mixing.

The amorphous precipitated silica of the present invention may be produced by a process comprising: (a) using distilled or deionized water to establish an additive aqueous alkali metal silicate solution containing from 10 to 30 weight percent $SiO_2$ and having an $SiO_2$:$M_2O$ molar ratio of from 1.6 to 3.9, and using distilled or deionized water to establish an initial aqueous alkali metal silicate solution containing from 0.5 to 4.5 weight percent $SiO_2$ and having an $SiO_2$:$M_2O$ molar ratio of from 1.6 to 3.9; (b) over a period of at least 10 minutes and with agitation, adding acid to the initial aqueous alkali metal silicate solution at a temperature below 98° C. to neutralize at least 60 percent of the $M_2O$ present in the initial aqueous alkali metal solution and thereby to form a first reaction mixture; (c) over a period of from 30 to 180 minutes, with agitation, and at a temperature of from 85° C. to 98° C., substantially simultaneously adding to the first reaction mixture: (1) additive aqueous alkali metal silicate solution, and (2) acid, thereby to form a second reaction mixture wherein the amount of the additive aqueous alkali metal silicate solution added is such that the amount of $SiO_2$ added is from 0.5 to 2.0 times the amount of $SiO_2$ present in the initial aqueous alkali metal silicate solution established in step (a) and wherein the amount of the acid added is such that at least 60 percent of the $M_2O$ contained in the additive aqueous alkali metal silicate solution added during the simultaneous addition is neutralized; (d) adding acid to the second reaction mixture with agitation at a temperature of from 85° C. to 98° C. to form a third reaction mixture having a pH below 9.3; (e) aging the third reaction mixture with agitation at a pH below 9.3 and at a temperature of from 85° C. to 98° C. for a period of from 0 to 120 minutes; (f) forming a fourth reaction mixture by adding to the aged third reaction mixture with agitation and at a temperature of from 85° C. to 98° C., a further quantity of additive aqueous alkali metal silicate solution and adding acid as necessary to maintain the pH at from 7.5 to 9.2 during the addition of the further quantity of the additive aqueous alkali metal silicate solution, wherein the amount of the additive aqueous alkali metal silicate solution added in step (f) is such that the amount of SiO2 added in step (f) is from 0.05 to 0.30 times the amount of SiO2 present in the third reaction mixture; (g) aging the fourth reaction mixture with agitation at a temperature of from 85° C. to 98° C. for a period of from 5 to 60 minutes; (h) adding acid to the aged fourth reaction mixture with agitation at a temperature of from 85° C. to 98° C. to form a fifth reaction mixture having a pH below 7.0; (i) aging the fifth reaction mixture with agitation at a pH below 7.0 and at a temperature of from 85° C. to 98° C. for a period of at least S minutes; (j) separating precipitated silica from most of the liquid of the aged fifth reaction mixture; (k) washing the separated precipitated silica with deionized or distilled water; and (l) drying the washed precipitated silica, wherein: (m) the alkali metal silicate is lithium silicate, sodium silicate, potassium silicate, or a mixture thereof; and (n) M is lithium, sodium, potassium, or a mixture thereof.

Optionally, prior to step (c) the first reaction mixture is aged with agitation at a temperature of from 85° C. to 98° C. for a period of from 5 to 120 minutes.

The composition of the initial aqueous alkali metal silicate solution established in step (a) may vary widely. Generally the initial aqueous alkali metal silicate solution comprises from 0.5 to 5.0 weight percent $SiO_2$. In many cases the initial aqueous alkali metal silicate solution comprises from 1.4 to 4.5 weight percent $SiO_2$. From 2 to 4.2 weight percent $SiO_2$ is preferred. Usually the initial aqueous alkali metal silicate solution has an $SiO_2$:$M_2O$ molar ratio of from 1.6 to 3.9. Often the $SiO_2$:$M_2O$ molar ratio is from 2.5 to 3.6. Frequently the $SiO_2$:$M_2O$ molar ratio is from 2.9 to 3.5. In many cases the $SiO_2$:$M_2O$ molar ratio is from 3.0 to 3.4. Preferably the $SiO_2$:$M_2O$ molar ratio is from 3.1 to 3.3.

The composition of the additive aqueous alkali metal silicate solution established in step (a) may also vary widely. Usually the additive aqueous alkali metal silicate solution comprises from 10 to 30 percent by weight $SiO_2$. Often the additive aqueous alkali metal silicate solution comprises from 10 to 25 percent by weight $SiO_2$. From 15 to 20 weight percent $SiO_2$ is preferred. Frequently the additive aqueous alkali metal silicate solution has an $SiO_2$:$M_2O$ molar ratio of from 2.5 to 3.6. In many cases the $SiO_2$:$M_2O$ molar ratio is from 2.9 to 3.5. Often the $SiO_2$:$M_2O$ molar ratio is from 3.0 to 3.4. Preferably the $SiO_2$:$M_2O$ molar ratio is from 3.1 to 3.3. Additive aqueous alkali metal silicate solution having the same composition may be used throughout the various silicate additions, or additive aqueous alkali metal silicate solutions having differing compositions may be used in different silicate addition steps.

The acid used in the process may also vary widely. In general, the acid added in steps (b), (c), and (f) should be strong enough to neutralize alkali metal silicate and cause precipitation of silica. The acid added in steps (d) and (h) should be strong enough to reduce the pH to desired values within the specified ranges. The acid used in the various acid addition steps may be the same or different, but preferably it is the same. A weak acid such as carbonic acid produced by the introduction of carbon dioxide to the reaction mixture may be used for precipitation of silica, but a stronger acid must be used in steps (d) and (h) when it is desired to reduce the pH to values below 7. It is preferred to use strong acid throughout the process. Examples of the strong acids include sulfuric acid, hydrochloric acid, nitric acid, phosphoric acid, and acetic acid. The strong mineral acids such as sulfuric acid, hydrochloric acid, nitric acid, and phosphoric acid are preferred; sulfuric acid is especially preferred.

The acid addition of step (b) is made over a period of at least 10 minutes. Often the acid addition is made over a period of at least 25 minutes. Frequently the acid addition of step (b) is made over a period of from 10 to 45 minutes. From 15 to 40 minutes is preferred. From 25 to 30 minutes is especially preferred.

The temperature of the reaction mixture during the acid addition of step (b) is below 98° C. From 85° C. to 98° C. is preferred.

At least 60 percent of the $M_2O$ present in the initial aqueous alkali metal silicate solution is neutralized during the acid addition of step (b). As much as 100 percent of the $M_2O$ may be neutralized if desired. Preferably from 70 to 90 percent of the $M_2O$ is neutralized.

The additions made is step (c) are made over a period of from 30 to 180 minutes. Often the additions are made over a period of from 60 to 150 minutes. Preferably the additions are made over a period of from 60 to 120 minutes.

The temperature of the reaction mixture during the additions of step (c) is from 85° C. to 98° C. From 88° C. to 95° C. is preferred.

In step (c), the amount of additive aqueous alkali metal silicate added is such that the amount of $SiO_2$ added is from 0.5 to 2 times the amount of $SiO_2$ present in the initial aqueous alkali metal silicate solution established in step (a). From 0.8 to 1.2 times the $SiO_2$ present in the initial aqueous alkali metal silicate solution is preferred.

The amount of acid added in step (c) is such that at least 60 percent of the $M_2O$ contained in the additive aqueous alkali metal silicate solution added in step (c) is neutralized. As much as 100 percent of such $M_2O$ may be neutralized if desired. Preferably from 70 to 90 percent of the $M_2O$ is neutralized.

The temperature of the reaction mixture during the acid addition of step (d) is from 85° C. to 98° C. From 88° C. to 95° C. is preferred.

In step (d), the acid is added such that the pH of the third reaction mixture is below 9.3. Often the pH is from 7.0 to below 9.3. A pH of from 7.5 to 9.0 is preferred.

Similarly, the third reaction mixture is aged in step (e) at a pH below 9.3. Often the pH is from 7.0 to below 9.3. In many instances the pH is from 7.5 to 9.0. A pH of from 8.0 to 9.0 is preferred.

The temperature of the third reaction mixture during the aging of step (e) is from 85° C. to 98° C. From 88° C. to 95° C. is preferred.

The aging in step (e) is for a period of from 0 to 120 minutes. In many cases the third reaction mixture is aged for a period of from 10 to 90 minutes. A period of from 20 to 40 minutes is preferred.

The temperature of the reaction mixture during the additions of step (f) is from 85° C. to 98° C. From 88° C. to 95° C. is preferred.

Acid is added in step (f) as necessary to maintain the pH of the reaction mixture at from 7.5 to 9.2 during the addition of the further quantity of additive aqueous alkali metal silicate solution. Often the pH is maintained at from 8.0 to 9.0. A pH of from 8.2 to 8.8 is preferred.

The amount of additive aqueous alkali metal silicate solution added in step (f) is such that the amount of SiO2 added in step (f) is from 0.05 to 0.25 times the amount of SiO2 present in the third reaction mixture. Preferably the amount of additive aqueous alkali metal silicate solution added in step (f) is such that the amount of SiO2 added in step (f) is from 0.1 to 0.2 times the amount of SiO2 present in the third reaction mixture.

The temperature of the fourth reaction mixture during the aging of step (g) is from 85° C. to 98° C. From 88° C. to 95° C. is preferred.

In step (g), the fourth reaction mixture is aged for a period of from 5 to 60 minutes. Frequently the fourth reaction mixture is aged for a period of from 15 to 45 minutes. A period of from 20 to 40 minutes is preferred.

The temperature of the reaction mixture during the acid addition of step (h) is from 85° C. to 98° C. From 88° C. to 95° C. is preferred.

In step (h), the acid is added such that the pH of the fifth reaction mixture is below 7.0. Often the pH is from 3.0 to 6.0. A pH of from 3.5 to 4.0 is preferred.

In step (i), the fifth reaction mixture is aged for a period of at least 5 minutes. Often the aging period is at least 10 minutes. An aging period of at least 15 minutes is preferred.

The temperature of the fifth reaction mixture during the aging of step (i) is from 85° C. to 98° C. From 88° C. to 95° C. is preferred.

The separation of step (j) may be accomplished by one or more techniques for separating solids from liquid such as, for example, filtration, centrifugation, decantation, and the like.

The washing of step (k) may be accomplished by any of the procedures known to the art for washing solids. Examples of such procedures include passing water through a filter cake, and reslurring the precipitated silica in water followed by separating the solids from the liquid. One washing cycle or a succession of washing cycles may be employed as desired. The primary purpose of washing is to remove salt formed by the various neutralizations to desirably low levels. Usually the precipitated silica is washed until the concentration of salt in the dried precipitated silica is less than or equal to 2 percent by weight. Preferably the precipitated silica is washed until the concentration of salt is less than or equal to 1 percent by weight.

The drying of step (1) may also be accomplished by one or more known techniques. For example, the precipitated silica may be dried in an air oven or in a vacuum oven. Preferably the precipitated silica is dispersed in water and spray dried in a column of hot air. The temperature at which drying is accomplished is not critical, but the usual practice is to employ temperatures of at least 70° C. Generally the drying temperature is less than 700° C. In most cases drying is continued until the precipitated silica has the characteristics of a powder. Ordinarily the dried precipitated silica is not absolutely anhydrous but contains bound water (from 2 to 5 weight percent) and adsorbed water (from 1 to 7 weight percent) in varying amounts, the latter depending partly upon the prevailing relative humidity. Adsorbed water is that water which is removed from the silica by heating at 105° C. for 24 hours at atmospheric pressure in a laboratory oven. Bound water is that water which is removed by additionally heating the silica at calcination temperatures, for example, from 1000° C. to 1200° C.

Another optional step which may be employed is size reduction. Size reduction techniques are themselves well known and may be exemplified by grinding and pulverizing. Particularly preferred is fluid energy milling using air or superheated steam as the working fluid. Fluid energy mills are themselves well known. See, for example, *Perry's Chemical Engineers Handbook*, 4th Edition, McGraw-Hill Book Company, New York, (1963), Library of Congress Catalog Card Number 6113168, pages 8–42 and 8–43; McCabe and Smith, *Unit Operations of Chemical Engineering*, 3rd Edition, McGraw-Hill Book Company, New York (1976), ISBN 0-07-044825-6, pages 844 and 845; F. E Albus, "The Modern Fluid Energy Mill", *Chemical Engineering Progress*, Volume 60, No. 6 (June 1964), pages 102–106, the entire disclosures of which are incorporated herein by reference. In fluid energy mills the solid particles are suspended in a gas stream and conveyed at high velocity in a circular or elliptical path. Some reduction occurs when the particles strike or rub against the walls of the confining chamber, but most of the reduction is believed to be caused by interparticle attrition.

The degrees of agitation used in the various steps of the invention may vary considerably. The agitation employed during the addition of one or more reactants should be at least sufficient to provide a thorough dispersion of the reactants and reaction mixture so as to avoid more than trivial locally high concentrations of reactants and to ensure that silica deposition occurs substantially uniformly thereby avoiding gellation on the macro scale. The agitation employed during aging should be at least sufficient to avoid settling of solids to ensure that silica deposition occurs substantially uniformly throughout the mass of silica particles rather than preferentially on those particles at or near the top of a settled layer of particles. The degrees of agitation may, and preferably are, greater than these minimums. In general, vigorous agitation is preferred.

Yet another optional step which may be employed is treating the precipitated silica with one or more materials which coat, partially coat, impregnate, and/or partially impregnate the silica. Many materials may be used for this purpose. In general, the type of material used depends upon the effect desired. Most often the materials are organic polymers. Examples of suitable materials include hydrocarbon oils, polyesters, polyamides, phenolic resins, aminoplast resins, polysiloxanes, polysilanes, and the like. The treatment step may be accomplished at any convenient time during or after formation of the precipitated silica.

The preferred process for producing the amorphous precipitated silica of the invention comprises: (a) establishing an additive aqueous alkali metal silicate solution containing from 15 to 20 weight percent $SiO_2$ and having an $SiO_2:M_2O$ molar ratio of from 3.1 to 3.3 and establishing an initial aqueous alkali metal silicate solution containing from 2 to 4.2 weight percent $SiO_2$ and having an $SiO_2:M_2O$ molar ratio of from 3.1 to 3.3; (b) over a period of at least 30 minutes and with agitation, adding acid to the initial aqueous alkali metal silicate solution at a temperature of from 88° C. to 95° C. to neutralize from 70 to 90 percent of the $M_2O$ present in the initial aqueous alkali metal solution and to form a first reaction mixture; (c) over a period of from 60 to about 120 minutes, with agitation, and at a temperature of from 88° C. to 95° C., substantially simultaneously adding to the first reaction mixture: (1) additive aqueous alkali metal silicate solution, and (2) acid, to form a second reaction mixture wherein the amount of the additive aqueous alkali metal silicate solution added is such that the amount of $SiO_2$ added is from 0.8 to 1.2 times the amount of $SiO_2$ present in the initial aqueous alkali metal silicate solution established in step (a) and wherein the amount of the acid added is such that from 70 to 90 percent of the $M_2O$ contained in the additive aqueous alkali metal silicate solution added during the simultaneous addition is neutralized; (d) adding acid to the second reaction mixture with agitation at a temperature of from 88° C. to 95° C. to form a third reaction mixture having a pH of from 8.0 to 9.0; (e) aging the third reaction mixture with agitation at a temperature of from 88° C. to 95° C. for a period of from 20 to 40 minutes; (f) forming a fourth reaction mixture by adding to the aged third reaction mixture with agitation and at a temperature of from 88° C. to 95° C., a further quantity of additive aqueous alkali metal silicate solution and adding acid as necessary to maintain the pH at from 8.2 to 8.8 during the addition of the further quantity of the additive aqueous alkali metal silicate solution, wherein the amount of the additive aqueous alkali metal silicate solution added in step (f) is such that the amount of $SiO_2$ added in step (f) is from 0.1 to 0.2 times the amount of $SiO_2$ present in the third reaction mixture; (g) aging the fourth reaction mixture with agitation at a temperature of from 88° C. to 95° C. for a period of from 20 to 40 minutes; (h) adding acid to the aged fourth reaction mixture with agitation at a temperature of from 88° C. to 95° C. to form a fifth reaction mixture having a pH of from 3.5 to 4.0; (i) aging the fifth reaction mixture with agitation at a temperature of from 88° C. to 95° C. for a period of at least 5 minutes; (j) separating precipitated silica from most of the liquid of the aged fifth reaction mixture; (k) washing the separated precipitated silica with water; and (l) drying the washed precipitated silica, wherein: (m) the alkali metal silicate is lithium silicate, sodium silicate, potassium silicate, or a mixture thereof; and (n) M is lithium, sodium, potassium, or a mixture thereof.

It is understood that one or more ranges in the preferred process may be used in lieu of the corresponding broader range or ranges in the broader process discussed earlier.

New cured organic rubber compositions comprising significant amounts of amorphous precipitated silica have now been discovered in which the amorphous precipitated silica is highly dispersed.

Therefore, in a cured organic rubber composition comprising from 20 to 120 parts of amorphous precipitated silica per hundred parts of rubber, a second embodiment of the invention is the improvement wherein the composition is characterized by a white area of less than 0.8 percent.

In this embodiment the white area is a characteristic of the cured organic rubber composition itself. Consequently the white area determination is made according to the method for determining standard white area except that the cured organic rubber composition tested need not be the standard formulation; in other words, the method begins at the subheading entitled "Microtomy Protocol".

As before stated, the cured organic rubber f composition of the invention is characterized by a white area of less than 0.8 percent. Often the white area is less than 0.7 percent. In many instances the white area less than 0.6 percent. Frequently the white area is less than 0.5 percent. A white area less than 0.45 percent is preferred.

The cured organic rubber composition comprises from 20 to 120 parts of amorphous precipitated silica per hundred parts of rubber by weight. Frequently the cured organic rubber composition comprises from 40 to 90 parts of amorphous precipitated silica per hundred parts of rubber. From 50 to 80 parts of amorphous precipitated silica per hundred parts of rubber is preferred.

A wide variety of organic rubbers and mixtures thereof are suitable for use in the cured organic rubber composition of the invention. Examples of such organic rubbers include natural rubber; cis-1,4-polyisoprene; cis-1,4-polybutadiene; trans-1,4-polybutadiene; 1,2-polybutadiene; co-(styrene-butadiene) composed of various percentages of styrene and the varying microstructures of polybutadiene just denoted; acrylonitrile-based rubber compositions; and isobutylene-based rubber compositions; or a mixture thereof, as described in, for example, U.S. Pat. Nos. 4,530,959; 4,616,065; 4,748,199; 4,866,131; 4,894,420; 4,925,894; 5,082,901; and 5,162,409.

The amount of organic rubber present in the cured organic rubber composition may vary widely. In most instances organic rubber constitutes from 20 to 83.3 percent by weight of the cured organic rubber composition. Often organic rubber constitutes from 20 to 80 percent by weight of the cured organic rubber composition. Frequently organic rubber constitutes from 30 to 75 percent by weight of the cured organic rubber composition. From 35 to 70 percent by weight is preferred. The proportion of organic rubber used in preparing the uncured organic rubber composition is substantially the same as that present in the cured organic rubber composition.

There are many other materials which are customarily and/or optionally present in the cured organic rubber compositions of the present invention. These include such materials as vulcanizing agent (usually, but not necessarily, sulfur), accelerator, lubricant, wax, antioxidant, reinforcing carbon black, semi-reinforcing carbon black, non-reinforcing carbon black, other pigment, stearic acid, and/or zinc oxide. The listing of such materials is by no means exhaustive. These and other ingredients may be employed in their customary amounts for their customary purposes so long as they do not seriously interfere with good cured organic rubber formulating practice.

The curable organic rubber composition may be formed from the ingredients in any manner known to the art. Mixing and milling are most commonly used. Similarly, a tire may be built, molded, and cured using the curable tire tread composition according to any of the general methods and techniques known to the art. In the region where the sidewall and tread are joined, the structure is usually tread over sidewall (TOS) or sidewall over tread (SWOT). The TOS structure is characterized by a peripheral inside face of the tread rubber being adhered to the outside face of the upper end portion of the sidewall. The SWOT structure is characterized by the inside face of the upper end portion of the sidewall being in close connection with a side face of the tread rubber. See U.S. Pat. No. 5,088,537. The TOS structure, the SWOT structure, or other structures may be used, but because of the greater ease with which retreading can be accomplished, the TOS structure is preferred.

The invention is further described in conjunction with the following examples which are to be considered illustrative rather than limiting, and in which all parts are parts by weight and all percentages are percentages by weight unless otherwise specified.

EXAMPLE 1

An additive aqueous sodium silicate solution containing 70 grams $Na_2O$ per liter and having an $SiO_2$:$Na_2O$ molar ratio of 3.2 was established at 92° C. using deionized water. An initial aqueous sodium silicate solution containing 11.8 grams $Na_2O$ per liter and having an $SiO_2$:$Na_2O$ molar ratio of 3.2 was established in a reactor at 92° C. using deionized water. Over a period of 30 minutes and with agitation, sulfuric acid was added to the initial aqueous sodium silicate solution at a temperature of 92°C. to neutralize 80 percent of the $Na_2O$ present in the initial aqueous sodium solution and to form a first reaction mixture. The first reaction mixture was aged at 92° C. with agitation for 30 minutes. Over a period of 90 minutes, with agitation, and at a temperature of 92° C., additive aqueous sodium silicate solution and sulfuric acid were substantially simultaneously added to the aged first reaction mixture to form a second reaction mixture wherein the amount of the additive aqueous sodium silicate solution added was such that the amount of $SiO_2$ added was equal to the amount of $SiO_2$ present in the initial aqueous sodium silicate solution, and wherein the amount of sulfuric acid added was such that 80 percent of the $Na_2O$ contained in the additive aqueous sodium silicate solution added during the simultaneous addition was neutralized. Sulfuric acid was added to the second reaction mixture with agitation at a temperature of 92° C. to form a third reaction mixture having a pH of 8.5. The third reaction mixture was aged with agitation at a temperature of 92° C. for a period of 30 minutes. A fourth reaction mixture was formed by adding to the aged third reaction mixture with agitation and at a temperature of 92° C., a further quantity of additive aqueous sodium silicate solution and adding sulfuric acid as necessary to maintain the pH at 8.5 during the addition of the further quantity of the additive aqueous sodium silicate solution, wherein the amount of the additive aqueous sodium silicate solution added is such that the amount of $SiO_2$ added is 0.15 times the amount of $SiO_2$ present in the third reaction mixture. The fourth reaction mixture was aged with agitation at a temperature of 92° C. for a period of 30 minutes. Sulfuric acid was added to the aged fourth reaction mixture with agitation at a temperature of 92° C. to form a fifth reaction mixture having a pH of 3.9. The fifth reaction mixture was aged with agitation at a temperature of from 92° C. for a period of 5 minutes. Precipitated silica was separated from most of the liquid of the aged fifth reaction mixture by filtration. The separated precipitated silica was washed with water and the washed precipitated silica was spray dried. The spray dried silica was then granulated in accordance with the general principles of U.S. Pat. No. 4,807,819.

EXAMPLE 2

The amorphous precipitated silica granules of Example 1, Hi-Sil® EZ amorphous precipitated silica granules (PPG Industries, Inc.) as Control 1 and Zeosil® 1165 amorphous precipitated silica beads (Rhône-Poulenc Chimie) as Control 2, were tested for standard white area. The white areas of the ten fields for each material, the standard white areas (i.e., the means), and various statistical data are shown in Table 1. "Upper 95% Mean" is an abbreviation for the upper 95% confidence limit for the 95% confidence interval about the mean and "Lower 95% Mean" is an abbreviation for the lower 95% confidence limit for the 95% confidence interval about the mean.

TABLE 1

|  | Example 1 | Control 1 | Control 2 |
| --- | --- | --- | --- |
| White Area, % | 0.28 | 1.09 | 0.71 |
|  | 0.75 | 1.10 | 0.96 |
|  | 0.28 | 1.02 | 0.74 |
|  | 0.31 | 1.52 | 1.03 |
|  | 0.70 | 1.72 | 0.77 |
|  | 0.40 | 0.97 | 1.02 |
|  | 0.55 | 1.15 | 1.41 |
|  | 0.28 | 0.99 | 1.12 |
|  | 0.34 | 1.24 | 0.73 |
|  | 0.27 | 0.94 | 1.19 |
| Standard White Area, % | 0.42 | 1.17 | 0.97 |
| Standard Deviation | 0.18 | 0.26 | 0.23 |
| Upper 95% Mean | 0.55 | 1.36 | 1.13 |
| Lower 95% Mean | 0.28 | 0.99 | 0.80 |

The three amorphous precipitated silicas were also tested for BET surface area, CTAB surface area, Sears surface Area and pore diameter at the maximum of the volume pore size distribution function (i.e., "pore diameter"). The results, together with the standard white areas, are shown in Table 2.

TABLE 2

|  | Example 1 | Control 1 | Control 2 |
| --- | --- | --- | --- |
| Standard White Area, % | 0.42 | 1.17 | 0.97 |
| BET Surface Area, $m^2/g$ | 165 | 153 | 156 |
| CTAB Surface Area, $m^2/g$ | 163 | 149 | 154 |
| Sears Surface Area, $m^2/g$ | 264 | 237 | 328 |
| Pore Diameter, nm | 20.4 | 23.9 | 26.0 |

Although the present invention has been described with reference to specific details of certain embodiments thereof, it is not intended that such details should be regarded as limitations upon the scope of the invention except insofar as they are included in the accompanying claims.

We claim:

1. Amorphous precipitated silica characterized by:
   (a) a standard white area less than 0.8 percent;
   (b) a BET surface area in the range of from 100 to 300 $m^2/g$;
   (c) a CTAB surface area in the range of from 85 to 275 $m^2/g$;

(d) a Sears surface area in the range of from 200 to 400 m²/g; and (e) a pore diameter at the maximum of the volume pore size distribution function of from 10 to 60 nm.

2. The amorphous precipitated silica of claim 1 characterized by a standard white area less than 0.7 percent.

3. The amorphous precipitated silica of claim 1 characterized by a standard white area less than 0.6 percent.

4. The amorphous precipitated silica of claim 1 characterized by a standard white area less than 0.5 percent.

5. The amorphous precipitated silica of claim 1 characterized by a standard white area less than 0.4 percent.

6. The amorphous precipitated silica of claim 5 characterized by:

(a) a BET surface area in the range of from 150 to 200 m²/g. (b) a CTAB surface area in the range of from 145 to 185 m²/g;

(c) a Sears surface area in the range of from 260 to 300 m²/g; and (d) a pore diameter at the maximum of the volume pore size distribution function of from 20 to 40 nm.

7. The amorphous precipitated silica of claim 1 characterized by:

(a) a BET surface area in the range of from 125 to 250 m²/g.

(b) a CTAB surface area in the range of from 120 to 185 m²/g;

(c) a Sears surface area in the range of from 240 to 340 m²/g; and (d) a pore diameter at the maximum of the volume pore size distribution function of from 15 to 50 nm.

* * * * *

UNITED STATES PATENT AND TRADEMARK OFFICE
CERTIFICATE OF CORRECTION

PATENT NO. : 5,888,467
DATED : March 30, 1999
INVENTOR(S) : Harold E. Swift et al.

Page 1 of 1

It is certified that error appears in the above-identified patent and that said Letters Patent is hereby corrected as shown below:

<u>Column 3,</u>
Line 28, "Microtomy Protocol" should be on a separate line.
Line 29, " Use an RMC MT-6000-XL microtome..." should be indented.

<u>See below</u>

Microtomy Protocol
      Use an RMC MT-6000-XL microtome...

<u>Column 17, claim 6,</u>
Line 16, should be -- $m^2/g$.--
Line 17, should be -- (b) a CTAB surface area in the range of from 145 to 185 $m^2/g$; --.

Signed and Sealed this

Thirtieth Day of October, 2001

Attest:

NICHOLAS P. GODICI
*Attesting Officer*    *Acting Director of the United States Patent and Trademark Office*